(12) United States Patent
Jensen et al.

(10) Patent No.: US 9,003,806 B2
(45) Date of Patent: Apr. 14, 2015

(54) METHOD OF OPERATING A COMBUSTOR FROM A LIQUID FUEL TO A GAS FUEL OPERATION

(75) Inventors: Gregory Earl Jensen, Greenville, SC (US); Mark William Pinson, Greer, SC (US); William Thomas Ross, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 560 days.

(21) Appl. No.: 13/412,110

(22) Filed: Mar. 5, 2012

(65) Prior Publication Data
US 2013/0227956 A1 Sep. 5, 2013

(51) Int. Cl.
*F23R 3/36* (2006.01)

(52) U.S. Cl.
CPC ............. *F23R 3/36* (2013.01); *F23D 2209/30* (2013.01); *F23N 2037/08* (2013.01); *Y02E 20/16* (2013.01)

(58) Field of Classification Search
CPC .... F23D 2209/30; F23N 2037/08; F23R 3/36
USPC ............ 60/772, 39.281, 39.094, 39.463, 737, 60/740, 742, 746
See application file for complete search history.

(56) References Cited

U.S. PATENT DOCUMENTS

| | | | |
|---|---|---|---|
| 4,344,280 A * | 8/1982 | Minakawa et al. | 60/39.092 |
| 6,250,063 B1 | 6/2001 | Davis, Jr. et al. | |
| 6,427,447 B1 | 8/2002 | Sowa | |
| 6,598,383 B1 | 7/2003 | Vandervort et al. | |
| 2001/0004827 A1 * | 6/2001 | Vandervort et al. | 60/39.55 |
| 2008/0154474 A1 * | 6/2008 | Iasillo et al. | 701/100 |

\* cited by examiner

*Primary Examiner* — Phutthiwat Wongwian
*Assistant Examiner* — Scott Walthour
(74) *Attorney, Agent, or Firm* — Cantor Colburn LLP

(57) ABSTRACT

A method of operating a combustor having a central nozzle and a plurality of outer nozzles surrounding the central nozzle is provided. The method includes providing a liquid fuel to only the plurality of outer nozzles at a specified total energy input. The method includes decreasing the liquid fuel to the plurality of outer nozzles while simultaneously increasing a gas fuel to the central nozzle and the plurality of outer nozzles to substantially maintain the specified total energy input. The method includes supplying a fuel-air ratio of the gas fuel to the central nozzle that exceeds a threshold value such that a central nozzle flame is anchored. An air-fuel ratio of the gas fuel to the plurality of outer nozzles is less than the threshold value such that a plurality of outer nozzle flames are lifted until a purge flow is supplied to the outer nozzles.

20 Claims, 3 Drawing Sheets

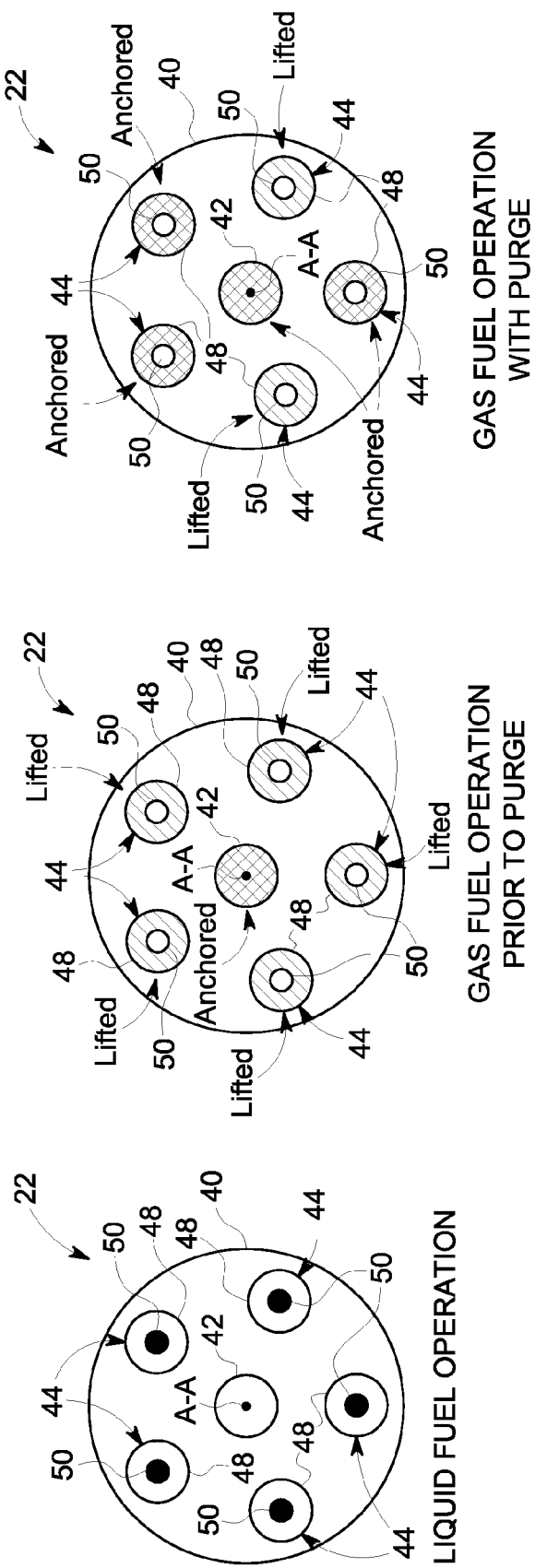

METHOD OF OPERATING A COMBUSTOR FROM A LIQUID FUEL TO A GAS FUEL OPERATION

BACKGROUND OF THE INVENTION

The subject matter disclosed herein relates to a method of operating a combustor for a gas turbine from a liquid fuel operation to a gas fuel operation.

Gas turbines include one or more combustors, which receive and combust air and fuel to produce hot combustion gases. For example, the gas turbine may include multiple combustion chambers positioned circumferentially around a rotational axis. Either a liquid fuel or a gas fuel may be injected into the combustor. In the event that the gas turbine is operating on liquid fuel and a transfer to gas fuel is required, the liquid fuel flow is first shut off or stopped, and then a purge fluid is sent through liquid fuel nozzles. The purging fluid removes any residual liquid fuel from the liquid fuel nozzles. There can be a delay between shutting of the liquid fuel flow and sending the purging air through the liquid fuel nozzles at a high enough flow rate or pressure. In the event a flame is anchored on the liquid fuel nozzles during the delay, a resulting pressure gradient may send hot combustion products into the liquid fuel nozzle, which in turn may cause damage.

In some types of combustion systems such as, for example, dry low NOx combustion systems, the combustor may only transfer from liquid fuel operation to gas fuel operation at a relatively low load. The transfer between the liquid fuel and the gas fuel may be performed, but requires unloading the gas turbine to the reduced load first. In a combined cycle power plant, unloading the gas turbine to a low load may also require for a steam turbine to taken off-line as well.

BRIEF DESCRIPTION OF THE INVENTION

According to one aspect of the invention, a method of operating a combustor is provided. The combustor has a central nozzle and a plurality of outer nozzles surrounding the central nozzle. The method includes providing a liquid fuel to only the plurality of outer nozzles at a specified total energy input. The method includes decreasing the liquid fuel to the plurality of outer nozzles while simultaneously increasing a gas fuel to the central nozzle and the plurality of outer nozzles to substantially maintain the specified total energy input. The method includes ceasing the supply of the liquid fuel to the plurality of outer nozzles while substantially maintaining the specified total energy input. The method includes supplying a fuel-air ratio of the gas fuel to the central nozzle that exceeds a threshold value such that a central nozzle flame is anchored. The method includes supplying the fuel-air ratio of the gas fuel to the plurality of outer nozzles that is less than the threshold value such that pluralities of outer nozzle flames are lifted. The method includes supplying a purge flow to the plurality of outer nozzles.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is an illustration of an end cover of the combustor shown in FIG. 1 during a mode of operation;

FIG. 3 is an illustration of an end cover of the combustor shown in FIG. 1 during another mode of operation;

FIG. 4 is an illustration of an end cover of the combustor shown in FIG. 1 during yet another mode of operation.

The detailed description explains embodiments of the invention, together with advantages and features, by way of example with reference to the drawings.

DETAILED DESCRIPTION OF THE INVENTION

Figure 1:
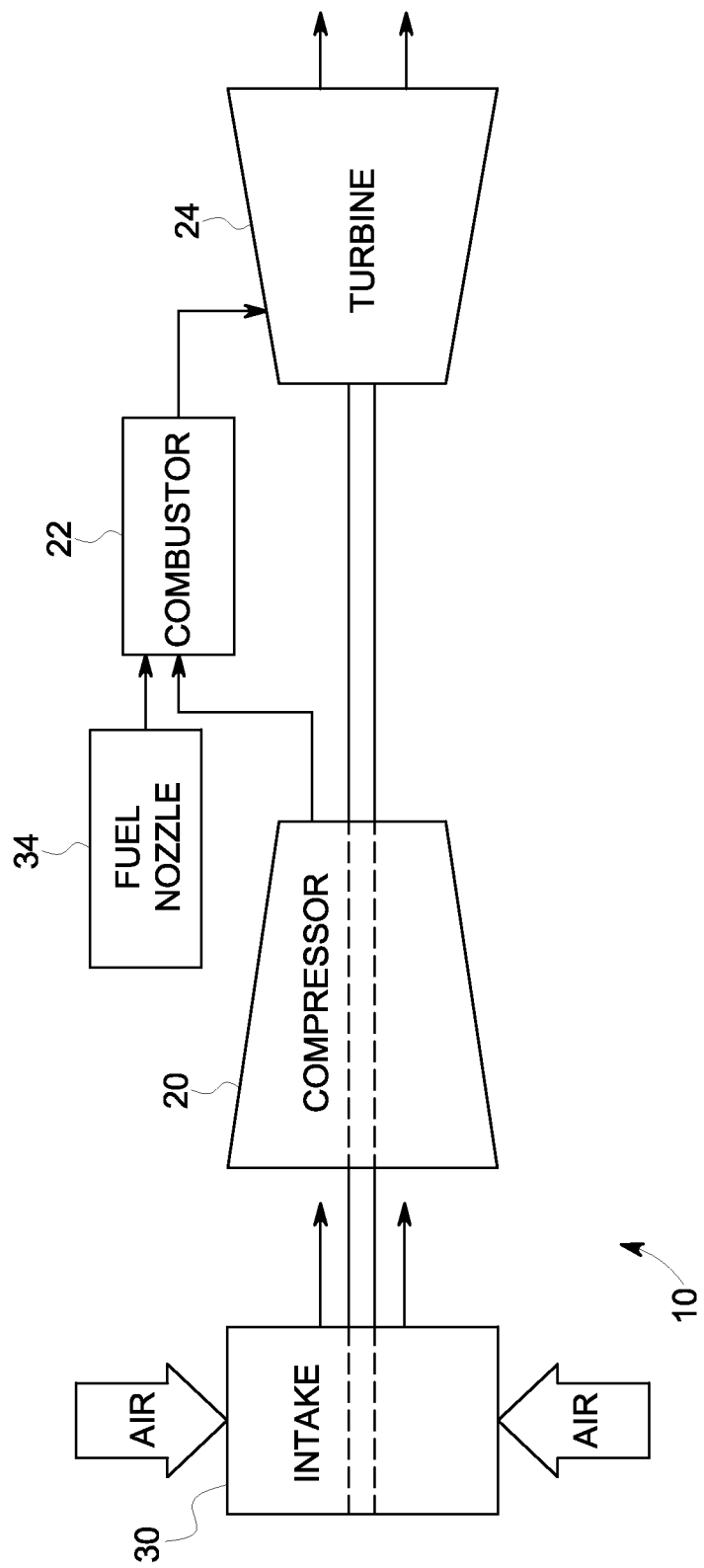
FIG. 1 is a schematic view of an exemplary gas turbine system having a combustor.

FIG. 1 illustrates a schematic exemplary power generation system indicated by reference number 10. The power generation system 10 is a gas turbine system having a compressor 20, a combustor 22, and a turbine 24. Air enters the power generation system 10 though an air intake 30 which feeds into the compressor 20, and work is exerted on the air by the compressor 20. The compressed air is then mixed with fuel by a fuel nozzle 34. The fuel nozzle 34 injects an air-fuel mixture into the combustor 22 in a specific ratio for combustion. The heat release generates high temperature pressurized gas exhaust that drives blades (not shown) that are located within the turbine 24. In one embodiment, the combustor 22 is a dry low NOx combustor.

Referring now to FIGS. 2-4, the combustor 22 includes an end cover 40 having a center nozzle gas fuel port 42 as well as a plurality of outer ports, or outer nozzle assemblies 44. The center nozzle gas fuel port 42 is located at a center axis A-A of the combustor 22, and the outer nozzle assemblies 44 surround the center nozzle gas fuel port 42. In the exemplary embodiment as shown in FIGS. 2-4, there are five outer nozzle assemblies 44 that surround the center nozzle gas fuel port 42, however it is to be understood that any number of outer nozzle assemblies 44 may be used.

Referring to FIGS. 2-4, the center nozzle gas fuel port 42 and the outer nozzle assemblies 44 all selectively provide a gas fuel (not shown) to the combustor 22. However, only the outer nozzle assemblies 44 provide a liquid fuel (not shown) to the combustor 22. Specifically, only the outer nozzle assemblies 44 each include an outer nozzle gas fuel port 48 and a liquid cartridge or outer nozzle liquid fuel port 50. That is, the center nozzle gas fuel port 42 does not include a liquid cartridge. The center nozzle gas fuel port 42 and the outer nozzle gas fuel ports 48 provide the gas fuel, and the outer nozzle liquid fuel port 50 provides the liquid fuel. The power generation system 10 (shown in FIG. 1) operates on either the gas fuel or, alternatively, the liquid fuel.

In the event the power generation system 10 is operating on liquid fuel and a transfer to the gas fuel is required, the flow of liquid fuel is stopped or ceased, and a purging flow such as, for example, a compressed air, is sent through the outer nozzle liquid fuel ports 50 of the outer nozzle assemblies 44. The purge flow is not activated until the flow of liquid fuel has ceased. In one embodiment, the purge flow is a non-reactive medium such as, for example, nitrogen or water. Alternatively, in another embodiment, the purge flow is compressed air. In yet another embodiment, the purge flow may be a reactive medium natural gas. In the event natural gas is employed, first the liquid fuel is purged by water. The water is then purged by the natural gas.

FIG. 2 is an illustration of the combustor 22 operating on the liquid fuel. As seen in FIG. 2, only the outer nozzle liquid fuel ports 50 of the outer nozzle assemblies 44 provide the liquid fuel at a specified total energy to the power generation system 10. In the event that a transfer to a gas fuel is needed, the liquid fuel provided by the outer nozzle liquid fuel ports 50 is gradually decreased, while simultaneously starting and increasing the amount of gas fuel. That is, the liquid fuel is gradually decreased while still substantially maintaining the specified total energy to the power generation system 10 through the use of a gaseous fuel.

FIG. 3 is an illustration of the combustor 22 operating on the gas fuel, where supply of the liquid fuel to the outer nozzle liquid fuel ports 50 of the outer nozzle assemblies 44 has ceased, but prior to the purging flow being supplied to the outer nozzle liquid fuel ports 50 of the outer nozzle assemblies 44. Instead, the gas fuel is supplied to the center nozzle gas fuel port 42 and the outer nozzle gas fuel ports 48 of the outer nozzle assemblies 44. Gas fuel is supplied to the center nozzle gas fuel port 42 and the gas nozzle 48 of the outer nozzle assemblies 44 at a specified fuel-air ratio such that the center nozzle flame (not shown) corresponding to the center nozzle gas fuel port 42 is anchored, and the gas nozzle flames (not shown) corresponding to the outer nozzle gas fuel ports 48 of the outer nozzle assemblies 44 are lifted. The specified fuel-air ratio generally exceeds a threshold value in order to create flame anchoring at either the center nozzle gas fuel port 42 or the outer nozzle gas ports 48 of the outer nozzle assemblies 44. Therefore, the fuel-air ratio supplied to the center nozzle gas fuel port 42 exceeds the threshold value such that the center nozzle flame is anchored, and the fuel-air ratio supplied to the outer nozzle gas fuel port 48 of the outer nozzle assemblies 44 is less than the threshold value such that the gas nozzles flames are lifted.

FIG. 4 is an illustration of the combustor 22 operating on the gas fuel, where the supply of the liquid fuel to the liquid injectors has ceased, and the purging flow is supplied to the outer nozzle liquid fuel ports 50. Gas fuel is supplied to the center nozzle gas fuel port 42 and the outer nozzle gas fuel port 48 of the outer nozzle assemblies 44 at the specified fuel-air ratio such that the center nozzle flame corresponding to the center nozzle gas fuel port 42 is still anchored. Also, at least one of the the gas nozzle flames corresponding to one of the outer nozzle gas fuel ports 48 of the outer nozzle assemblies 44 are also anchored, and the remaining gas nozzle flames are lifted as the purge flow is supplied to the outer nozzle liquid fuel ports 50 of the outer nozzle assemblies 44. In the exemplary embodiment as shown in FIG. 4, three gas nozzle flames are anchored. Specifically, the gas nozzle flames corresponding to the outer nozzle gas fuel ports 48 located at the one o'clock, the six o'clock, and the eleven o'clock position of the end cover 40 are anchored. The gas nozzle flames corresponding to the gas nozzles at the four o'clock and the eight o'clock position of the end cover 40 are lifted. It should be noted that the illustration of FIG. 4 is only one embodiment, and other approaches may be used as well. For example, in an alternative embodiment, the outer nozzle gas fuel ports 48 at the one o'clock, the six o'clock, and the eleven o'clock position of the end cover 40 could be lifted, and the outer nozzle gas fuel ports 48 at the four o'clock and the eight o'clock position of the end cover 40 are anchored.

Figure 5:
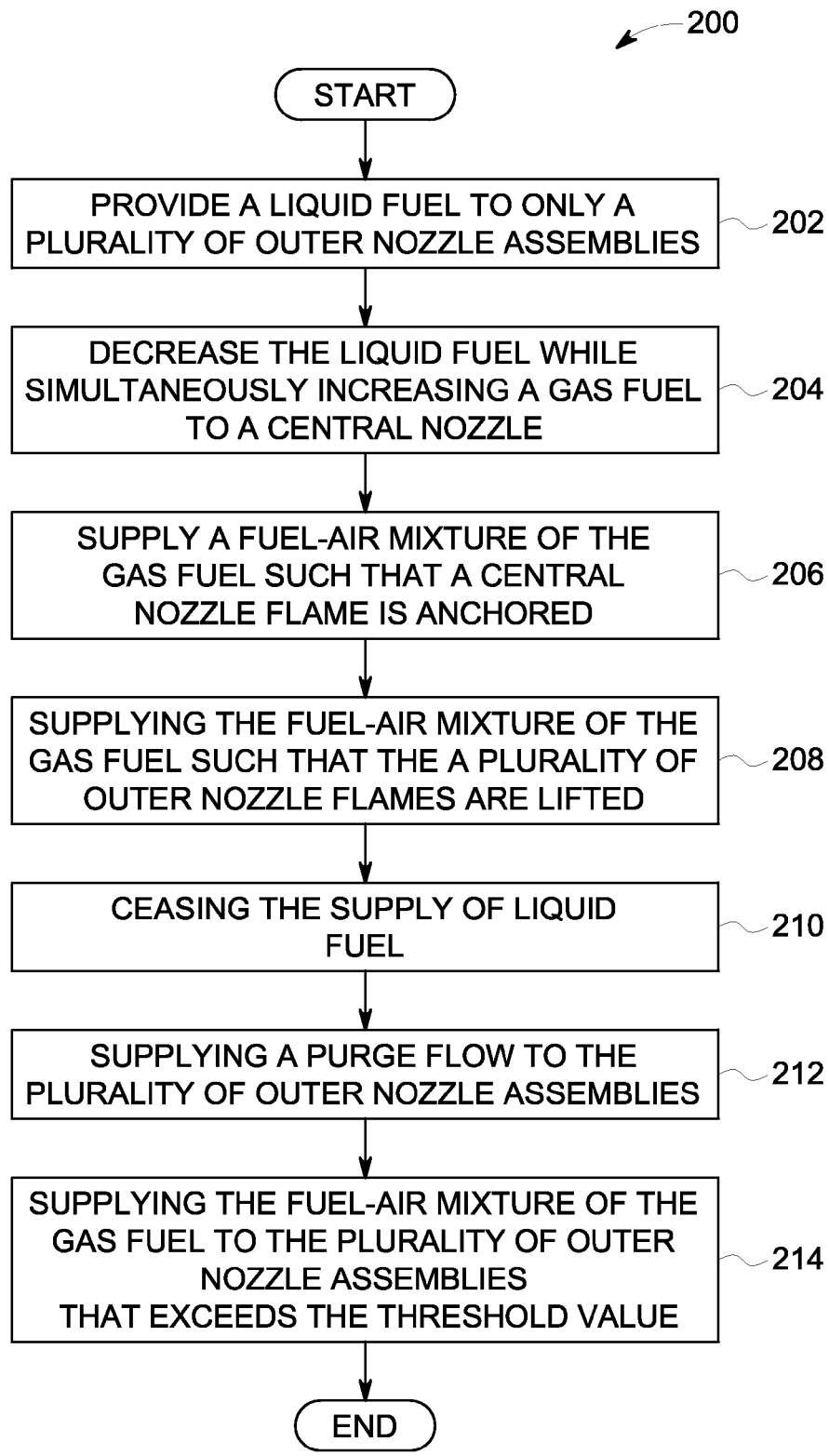
FIG. 5 is a process flow diagram illustrating one approach for operating the combustor shown in FIG. 1.

FIG. 5 is a process flow diagram illustrating one approach of operating the power generation system 10 in the event that a transfer to from the liquid fuel to the gas fuel is required. Referring now to both FIGS. 2 and 5, process 200 begins at 202, where the liquid fuel is provided to only the outer nozzle liquid fuel ports 50 of the outer nozzle assemblies 44 at a specified total energy. Process 200 may then proceed to 204.

In 204, the liquid fuel supplied to the outer nozzle liquid fuel ports 50 is gradually decreased, while simultaneously increasing the gas fuel to the center nozzle gas fuel port 42 and the outer nozzle gas fuel ports 48 of the outer nozzle assemblies 44 to generally maintain the specified total energy input to the gas turbine. Process 200 may then proceed to 206.

In 206, the fuel-air ratio of the gas fuel supplied to the center nozzle gas fuel port 42 exceeds the threshold value such that the central nozzle flame is anchored. Specifically, the specified fuel-air ratio generally has to exceed the threshold value in order to create flame anchoring at the center nozzle gas fuel port 42. Process 200 may then proceed to 208.

In 208, the fuel-air ratio of the gas fuel supplied to the outer nozzle gas fuel ports 48 of the outer nozzle assemblies 44 is less than the threshold value such that the gas nozzles flames are lifted. Process 200 may then proceed to 210.

In 210, the supply of the liquid fuel to the outer nozzle liquid fuel ports 50 of the outer nozzle assemblies 44 is ceased, while generally maintaining the specified total energy input to the gas turbine. Process 200 may then proceed to 212.

In 212, the purge flow is supplied to the outer nozzle liquid fuel ports 50 of the outer nozzle assemblies 44. Process 200 may then proceed to 214.

In 214, at least one of the gas nozzle flames corresponding to one of the outer nozzle gas fuel ports 48 of the outer nozzle assemblies 44 are anchored, and the remaining gas nozzle flames are lifted as the purge flow is supplied to the outer nozzle liquid fuel ports 50 of the outer nozzle assemblies 44. For example, in the embodiment as shown in FIG. 4, three gas nozzle flames are anchored. Process 200 may then terminate.

The approach of operating the power generation system 10 in the event that a transfer to from the liquid fuel to the gas fuel is required as described in FIGS. 2-5 allows for a gas turbine to transfer from the liquid fuel to the gas fuel without the need to significantly reduce load. In a combined cycle power plant, maintaining the load during the transfer from the liquid fuel to the gas fuel also allows for a steam turbine to stay on-line as well. Thus, transferring from liquid fuel to gas fuel operation may be performed more frequently when employing the power generation system 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating a combustor, the combustor having a central nozzle and a plurality of outer nozzles surrounding the central nozzle, comprising;
   providing a liquid fuel to only the plurality of outer nozzles at a specified total energy input; and
   transitioning from liquid fuel operation of the combustor to gas fuel operation, the transition comprising:
      decreasing the liquid fuel to the plurality of outer nozzles while simultaneously increasing a gas fuel to the central nozzle and the plurality of outer nozzles to substantially maintain the specified total energy input;

supplying a fuel-air ratio of the gas fuel to the central nozzle that exceeds a threshold value such that a central nozzle flame is anchored;

supplying the fuel-air ratio of the gas fuel to the plurality of outer nozzles that is less than the threshold value such that a plurality of outer nozzle flames are lifted;

ceasing a supply of the liquid fuel to the plurality of outer ports while substantially maintaining the specified total energy input; and supplying a purge flow to the plurality of outer nozzles.

2. The method as recited in claim 1, comprising supplying the fuel-air ratio of the gas fuel to the plurality of outer nozzles that exceeds the threshold value such that at least one of the plurality of outer nozzle flames are anchored as the purge flow is supplied to the plurality of outer nozzles.

3. The method as recited in claim 2, comprising supplying the fuel-air ratio of the gas fuel that exceeds the threshold value to each of the plurality of outer nozzles located at a one o'clock, a six o'clock, and an eleven o'clock position of an end cover.

4. The method as recited in claim 1, comprising providing a reactive medium as the purge flow.

5. The method as recited in claim 4, comprising purging the liquid fuel by water before providing the reactive medium.

6. The method as recited in claim 1, comprising providing one of a non-reactive medium that is at least one of nitrogen and water, or compressed air as the purge flow.

7. The method as recited in claim 1, comprising including a gas fuel port and a liquid fuel port with each of the plurality of outer nozzles.

8. The method as recited in claim 7, wherein the gas fuel port provides the gas fuel and the liquid fuel port provides the liquid fuel.

9. The method as recited in claim 1, comprising locating the central nozzle along a central axis of the combustor.

10. The method as recited in claim 1, comprising providing five outer nozzles as the plurality of outer nozzles.

11. The method as recited in claim 1, wherein the combustor is a dry low NOx combustor.

12. A method of operating a gas turbine having a combustor, the combustor having a central nozzle and a plurality of outer nozzles surrounding the central nozzle, comprising;

providing a liquid fuel to only the plurality of outer nozzles at a specified total energy input to the gas turbine; and transitioning from liquid fuel operation of the combustor to gas fuel operation, the transition comprising:

decreasing the liquid fuel to the plurality of outer nozzles while simultaneously increasing a gas fuel to the central nozzle and the plurality of outer nozzles to substantially maintain the specified total energy input to the gas turbine;

supplying a fuel-air ratio of the gas fuel to the central nozzle that exceeds a threshold value such that a central nozzle flame is anchored;

supplying the fuel-air ratio of the gas fuel to the plurality of outer nozzles that is less than the threshold value such that a plurality of outer nozzle flames are lifted;

ceasing a supply of the liquid fuel to the plurality of outer nozzles while substantially maintaining the specified total energy input to the gas turbine;

supplying a purge flow to the plurality of outer nozzles; and supplying the fuel-air ratio of the gas fuel to the plurality of outer nozzles that exceeds the threshold value such that at least one of the plurality of outer nozzle flames are anchored as the purge flow is supplied to the plurality of outer nozzles.

13. The method as recited in claim 12, comprising supplying the fuel-air ratio of the gas fuel that exceeds the threshold value to each of the plurality of outer nozzles located at a one o'clock, a six o'clock, and an eleven o'clock position of an end cover.

14. The method as recited in claim 12, comprising providing a reactive medium as the purge flow.

15. The method as recited in claim 14, comprising purging the liquid fuel by water before providing the reactive medium.

16. The method as recited in claim 12, comprising providing one of a non-reactive medium that is at least one of nitrogen and water, or compressed air as the purge flow.

17. The method as recited in claim 12, comprising including a gas fuel port and a liquid fuel port with each of the plurality of outer nozzles.

18. The method as recited in claim 17, wherein the gas fuel port provides the gas fuel and the liquid fuel port provides the liquid fuel.

19. The method as recited in claim 12, comprising locating the central nozzle along a central axis of the combustor.

20. The method as recited in claim 12, comprising providing five outer nozzles as the plurality of outer nozzles.

* * * * *